Feb. 10, 1948.    O. T. FRANCIS    2,435,579
VOLTAGE MAGNITUDE DISCRIMINATOR CIRCUIT
Filed May 10, 1943
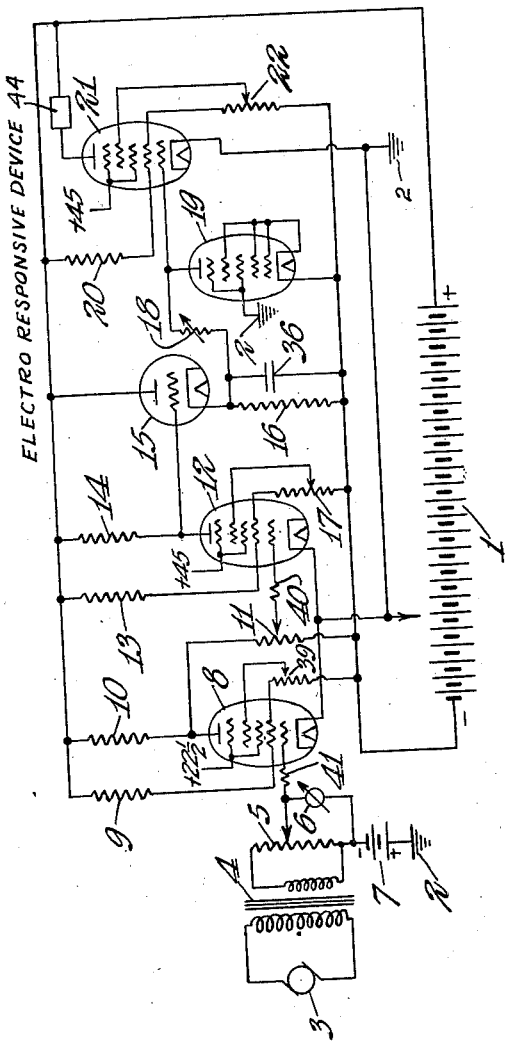
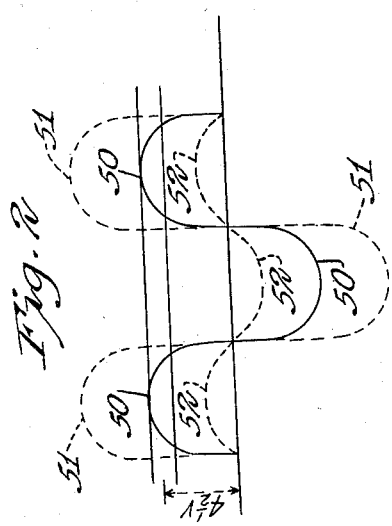
Inventor
Oliver T. Francis

Patented Feb. 10, 1948

2,435,579

UNITED STATES PATENT OFFICE 2,435,579

VOLTAGE MAGNITUDE DISCRIMINATOR CIRCUIT

Oliver T. Francis, Renville, Minn.

Application May 10, 1943, Serial No. 486,343

8 Claims. (Cl. 179—171)

This invention relates to voltage discriminator circuits, and more particularly to circuits responsive to input voltages of predetermined magnitude and not less than predetermined duration.

Vacuum tube circuits responsive to input voltages of predetermined magnitude have found wide use in voltage magnitude selective systems. Such a selective system comprises a plurality of circuits each responsive to a different magnitude of input voltage. It is mandatory in such systems that a circuit responsive to a lower magnitude of voltage, does not operate as the input voltage rises to the steady higher value at which a higher voltage circuit operates. It is customary to place a "slow acting relay" as the electro-responsive device in the output of a voltage magnitude operated circuit in order that it may not be operated by an input voltage of shorter duration. It is one of the objects of this invention to provide a novel time delay circuit which shall render a vacuum tube voltage magnitude operated circuit non-responsive to input voltages of less than predetermined duration.

Vacuum tube circuits which operate at a predetermined magnitude of input voltage have in the past required numerous biasing batteries which render said circuit cumbersome, unduly complicated, and suitable for operation only at fixed installations. It is an object of the present invention to provide a voltage magnitude operated circuit free from these undesirable features.

Circuits responsive only to input voltages of predetermined magnitude have in the past utilized vacuum tubes having a plurality of grids, and by applying voltages differing in phase by 180 degrees have rendered said tubes conductive to space current when the voltage applied to both of said grids approach zero value. It is one of the objects of this invention to provide a circuit for a pentigrid converter tube wherein variations in voltage of its anode grid may be applied to its fourth grid, (the anode grid voltage in such tubes being approximately 180 degrees out of phase with the control grid voltage) to thereby render the plate circuit of said tube conductive only at a predetermined magnitude of voltage applied to its first control grid.

These and other objects will become apparent from the following description, claims, and figures, wherein:

Figure 1 is a circuit responsive to an input voltage of predetermined magnitude and of not less than a predetermined duration.

Fig. 2 shows a plurality of sine voltages applied to the input circuit of Fig. 1.

Referring to Fig. 1, I have shown a means for supplying a voltage of predetermined magnitude and not less than a predetermined duration, comprising an A. C. generator 3, transformer 4, voltage divider 5, biasing battery 7, and meter 6. The above means for supplying said input voltages having said magnitude and duration characteristics forms no part of this invention and is thrown merely to illustrate the functioning of the remainder of the circuit. In the art of voltage magnitude selective systems numerous means of producing voltages of predetermined magnitude and not less than predetermined duration are known. The functioning of my means for producing such voltages is as follows: Transformer 4 steps the voltage of A. C. generator 3 down to the approximate value desired. Voltage divider 5 is provided in order that the magnitude of the alternating component of voltage applied to the control grid of tube 8 may be the more readily adjusted. A meter 6 is placed across a portion of voltage divider 5 in order that the A. C. component of the voltage applied to the control grid of tube 8 may be the more readily observed in the test of my apparatus hereinafter described.

The circuit comprising my invention which responds only to an input voltage of predetermined magnitude and of not less than a predetermined duration will now be described. Vacuum tube 8 may be of the conventional "pentigrid converter" type. Its anode grid is connected to the positive terminal of battery 1 through resistance 9. Resistances 9 and 39 are connected to the same terminal of the anode grid, but are shown as they are to simplify the drawings. The same practice is followed in the connections of the anode grids of the other tubes in the circuit. Its third and fifth grids are connected together internally and are connected to battery 1 at a point more positive than its cathode. Its fourth grid is connected to a point on potentiometer 39. Its plate is connected to the positive terminal of battery 1 through resistance 10, and to the negative terminal of battery 1 through a high resistance potentiometer 11.

Vacuum tube 12 may also be of the "pentigrid converter" type. Its first grid is connected to potentiometer 11, through current limiting resistance 40. Its anode grid is connected to the positive terminal of battery 1 through resistance 13, and to the negative terminal of battery 1 through high resistance potentiometer 17. Its third and fifth grids are connected to a positive terminal on battery 1. Its fourth grid is connected to a point on potentiometer 17. Its plate is connected through resistance 14 to the positive terminal of battery 1 and to grid of "cathode follower" vacuum tube 15.

The plate of vacuum tube 15 is connected to the positive terminal of battery 1. In its common input and output circuit is connected its load comprising the parallel connection of resistance 16 and condenser 36.

Vacuum tube 21 may also be of the "pentigrid converter" type. Its first grid is connected to the cathode of tube 15 through variable D. C. voltage dropping resistance 18 and through vacuum tube grid leak 19, which may also be of the "pentigrid converter" type. The cathode, first, second, and fourth grids of tube 19 are connected to the negative terminal of battery 1. The third and fifth grids of tube 19 are connected to a terminal on battery 1, more positive than its cathode. A multiple grid vacuum tube such as 19 has a high A. C. impedance while its D. C. impedance is dependent on the potential impressed on its third and fifth grids. Since the D. C. impedance of tube 19 is small compared with resistance 18, the D. C. potential of the first grid of tube 21 is adjusted to desired value by varying resistance 18, whereas the A. C. component of voltage variations across resistance 16 appears to a large extent across the plate and cathode of vacuum tube 19. The anode grid of tube 21 is connected to the positive terminal of battery 1 through resistance 20, and through high resistance potentiometer 22 to negative terminal of battery 1. The third and fifth grids of tube 21 are connected to a positive terminal of battery 1. The fourth grid of tube 21 is connected to a point on potentiometer 22. The plate of tube 21 is connected to the positive terminal of battery 1 through electro-responsive device 44.

In operation when signals of a predetermined voltage are applied to the first grid of tube 8 from voltage divider 5, plate current is permitted to flow from positive terminal of battery 1, through resistance 10, to the plate and cathode of tube 8 and to ground. This impresses a slightly negative potential on the first grid of tube 12, permitting current to flow from the positive terminal of battery 1, resistance 14, to cathode of tube 12, to ground 2. It is to be here noted that as long as the first grid of tube 12 is positive this current through resistance 14 is blocked by the negative potential impressed on the fourth grid of tube 12 by potentiometer 17, one terminal of which is connected to the anode grid of tube 12 and the other terminal to the negative terminal of battery 1. If the first grid of tube 12 is positive, there is a large voltage drop through resistance 13. The potential of the anode grid of tube 12 being lowered by the voltage drop across resistance 13 the fourth grid of tube 12 blocks current from flowing through resistance 14. The grid of cathode follower tube 15 is thrown negative when plate current flows in tube 12 as a result of the first grid of tube 12 being thrown slightly negative, and the charge begins to leak off of condenser 36 through resistance 16.

If the plate of tube 12 remains at a low potential for a sufficient length of time the charge on condenser 36 will leak off sufficiently to allow the first grid of tube 21 to assume a slightly negative potential, permitting current to flow from the positive terminal of battery 1, through electroresponsive device 44, plate to cathode of tube 21 to ground 2. It will be noted that the fourth grid of tube 21 blocks this current when the fourth grid of tube 21 is negative by reason of the voltage drop through resistance 20 as described for tube 12.

If on the other hand the voltage impressed on the first grid of tube 8 is above a predetermined value, the voltage drop through resistance 9, a portion of which is applied to the fourth grid of tube 8 is sufficiently large to cause said fourth grid to block plate current in tube 8. The first grid of tube 12 then remains positive and the fourth grid of tube 12 blocks plate current through tube 12. The cathode of tube 15 remains at a high positive potential and tube 21 remains blocked, with no response in electro-responsive device 44.

To further clarify the operation of my invention the specific values of one of the circuits used in tests will be described. It will be understood, however, that my invention is not limited to the specific values of circuit elements, or to elements of the same order, but only as defined in the appended claims.

Generator 3 was a 110 volt, 60 cycle power line. Transformer 4 stepped this voltage down to six volts across voltage divider 5. "C" battery 7 was six volts. Tubes 8, 12, 19, 21, were type 2A7. Tube 15 was a 2A5 connected as a triode. Resistances 9, 10, 13, 14, 20 were 100,000 ohms each. Resistances 39, 17, 22 were twenty megohms each and the fourth grids of tubes 8, 12, and 21 were connected to their respective mid-points. Potentiometer 11 was a ten megohm resistance, maximum value. Variable resistor 18 was a one megohm maximum value resistor. Resistance 16 was one fourth megohm. Condenser 36 was of .2 micro-farad capacity. Resistances 40, and 41 were ten megohms each. The positive terminal of battery 1 was plus 135 volts. Its negative terminal was minus 45 volts. When voltage divider was adjusted to render a voltage drop across meter 6 of 4½ volts a response appeared across electro-responsive device 44. When the voltage across meter 6 was increased or decreased by .1 volt by varying voltage divider 5 no response whatever appeared across electro-responsive device 44.

Referring to Fig. 2, where three waves 50, 51, 52 input voltages are shown, the reason for this can be seen. When the input voltage was 4½ volts (Fig. 2, curve 50) the plate of tubes 8 and 12 remained at a low potential for sufficient time for the charge to leak off of condenser 36 through resistance 16, and permit the first grid of tube 21 to go slightly negative. If a higher sine wave voltage was applied as shown by curve 51 of Fig. 2, the plate of tube 12 was not lowered for sufficient length of time to permit the charge on condenser 36 to leak off and no response whatever appeared in electro-responsive device 44 under these conditions. If less than 4½ volts (Fig. 2, curve 52) was applied to the first grid of tube 8, tube 8 remained blocked by "C" battery 7, and tube 12 was non-conductive.

To further clarify the functioning of my invention specific values of the circuit tested with the voltages shown in Fig. 2 applied to grid of tube 8 may be assumed. When the control grid of tube 8 was negative with respect to its cathode by from 1.4 to 1.6 volts the plate impedance of tube 8 was sufficiently low to cause the plate impedance of tube 12 to be low with the result that the grid of tube 15 was negative and the charge on condenser 36 was permitted to leak off through resistance 16 and permit current to flow through electro-responsive device 44 and the plate impedance of tube 21. This condition was fully met by curve 50 of Fig. 2, since the summation of the voltage of biasing battery 7 (minus six volts) and the positive lobe of the alternating current voltage (4.5 volts) across meter 6, maintained the first grid of tube 8 at minus 1.5 volts with respect to its cathode for a length of time sufficient for condenser 36 to discharge through resistance 16.

When however the voltage across meter 6 increased as shown in curve 51, Fig. 2, the length of time (either on the ascending or the descending portion of curve 51) that the first grid of tube 8 was between minus 1.4 volts and minus 1.6 volts with respect to its cathode was very brief and not sufficient for the charge on condenser 36 to leak off to such an extent as to permit current to flow through electro-responsive device 44, and no response whatsoever appeared in device 44 under conditions of input voltage shown in curve 51 of Fig. 2.

In the condition shown in curve 52 of Fig. 2, the positive lobe of the input voltage across meter 6 was of insufficient magnitude to overcome the minus six volts of biasing battery 7 and the plate impedance of tube 8 remained high with resultant no response in electro-responsive device 44.

It is obvious that the invention may take widely different forms from those illustrated and it is to be limited in scope only as defined in the following claims.

What I claim is:

1. A discriminator circuit comprising: a vacuum tube having a plate, filament, an anode grid and a plurality of control grids, a load in the circuit of said plate, a load in the circuit of said anode grid, a source of signal voltage, means for applying said voltage to a first of said control grids to permit plate current to flow in said tube, means for blocking said plate current as said signal voltage increases beyond a predetermined value, said last means comprising means for applying voltage across said load of said anode grid to a second of said control grids, a second vacuum tube having a plate, an anode grid, and a plurality of control grids, a load in the circuit of said plate of said second tube, a load in the circuit of said anode grid of said second tube, means for applying voltage across said load in the circuit of said anode grid of said second tube to a second control grid in said second tube, means for applying voltage across said load in the circuit of said plate of said first tube to a first of said control grids in said second of said tubes to permit current to flow through said load in the circuit of said plate of said second tube, a cathode follower tube having an input and an output circuit, means for applying variations in voltage across said load in the circuit of said plate of said second tube to said input circuit of said cathode follower tube, a load comprising the parallel connection of a resistance and a condenser connected in the common input and output circuit of said cathode follower tube, a fourth vacuum tube having a plate, cathode, an anode grid and a plurality of control grids, a load connected in the circuit of said plate of said fourth tube, a load connected in the circuit of said anode grid of said fourth tube, means for applying voltage variations across said condenser to a first of said control grids of said fourth tube, said last means comprising a voltage dropping resistance connecting said last grid to the positive terminal of said condenser, a grid leak for said last grid comprising a grid leak vacuum tube having a plate, screen grid, control electrode, and cathode, said plate being connected to said first control grid of said fourth tube, said cathode and said control electrode of said grid leak tube being connected to the cathode of said fourth tube, and means for indicating voltage variations across said load connected in the circuit of said plate of said fourth tube.

2. A vacuum tube circuit responsive to an input voltage of only one predetermined magnitude comprising: a vacuum tube having a plate, an anode grid, and a plurality of control electrodes, a load in the circuit of said plate, a load in the circuit of said anode grid, means for applying said input voltage to a first of said control electrodes to permit current to flow through both of said loads, means for applying a portion of the voltage produced across said load in the circuit of said anode grid to a second of said control electrodes to block current in said plate circuit as said input voltage increases beyond said predetermined magnitude, and means for indicating voltage variations across said load in the circuit of said plate.

3. A vacuum tube circuit responsive to input voltages of one predetermined magnitude only, comprising: a vacuum tube having a plate, an anode grid, a screen grid, and a plurality of control electrodes, a load in the circuit of said plate, a load in the circuit of said anode grid, means for impressing a constant positive potential on said screen grid, means for applying a varying voltage to a first of said control electrodes to permit current to flow through both of said loads, means for applying a portion of the voltage produced across said load in the circuit of said anode grid to a second of said control electrodes to block current flow in said load in the circuit of said plate for values of said varying voltage above said predetermined magnitude, and means for indicating voltage variations across said load in said circuit of said plate.

4. A vacuum tube circuit responsive only to input voltages of predetermined magnitude and of not less than predetermined time length, comprising: a vacuum tube having a plate, cathode, an anode grid, a first control electrode for controlling current from said anode grid and said plate to said cathode, a second control electrode for controlling current from said plate, an anode grid load in the circuit of said anode grid, a plate load in the circuit of said plate, means for applying input voltages of said predetermined magnitude to said first control electrode to permit current to flow through both of said loads, means for applying a portion of the voltage across said grid load to said second control electrode to block current through said plate load for input voltages above said predetermined magnitude, a thermionic tube having an input and an output circuit, a resistance in parallel with a condenser in said input and said output circuit, indicating means responsive to voltages below a predetermined value across said condenser, and means for applying voltage variations across said plate load to said input circuit, the RC time element of said resistance and said condenser being of sufficient magnitude to render said indicating means non-responsive to input voltages of less than said predetermined time length.

5. A vacuum tube circuit responsive to input voltages of one predetermined magnitude only, comprising: a vacuum tube having a plate, cathode, anode electrode, screen grid, and a plurality of control grids, a plate load and a source of voltage in the circuit of said plate, an anode load and said source of voltage in the circuit of said anode electrode, means for maintaining said screen grid at a steady positive potential with respect to said cathode, means for applying said input voltages to a first of said control grids to permit current to flow through both of said loads, means for applying a portion of the voltage across said anode load to a second of said control grids to block current flow through said plate load for input voltages above said predetermined magnitude, said last means comprising a resistance connecting said anode electrode and a negative point on said source of voltage, means for connecting said second control grid to an intermediate point on said resistance, and means for indicating voltage variations across said plate load.

6. A vacuum tube circuit responsive to input voltages of one predetermined magnitude only, comprising: a vacuum tube having a plate, cathode, anode electrode, a first grid for controlling space current from said cathode to said plate and said anode electrode, a second grid for controlling space current from said cathode to said plate, a plate load in the circuit of said plate, an anode load in the circuit of said anode electrode, means for applying said voltages to said first of said grids to permit current to flow through both of said loads, means for applying a portion of the voltage variations across said anode load to said second of said grids to block current flow through said plate load for input voltages above said predetermined magnitude, and means for indicating voltage variations across said plate load.

7. A vacuum tube circuit responsive to input voltages of one magnitude only comprising: a vacuum tube having control grid means, a first anode electrode, a second anode electrode, a cathode, a separate load in the circuit of each of said electrodes, means for applying said input voltages to said grid control means to permit current to flow through said load in the circuit of each of said electrodes, an auxiliary grid between said first electrode and said cathode, means for applying a portion of the voltage across said load in the circuit of said second electrode to said auxiliary grid to block current through said load in the circuit of said first electrode and means for indicating current variations through said load in the circuit of said first electrode.

8. In a circuit for receiving impulses of a predetermined voltage magnitude and not less than predetermined duration, a vacuum tube having an input and an output circuit, said output circuit being conductive only at an input voltage of said predetermined magnitude, a condenser, means for applying said impulses to said input circuit to permit current to flow in said output circuit for said duration, means for changing the charge on said condenser at a predetermined rate for said duration of current flow in said output circuit, a second vacuum tube having a grid circuit and plate circuit, the plate circuit of said second tube being conductive only at the voltage of the charge remaining on said condenser at the end of said duration, means for applying the voltage across said condenser to said grid circuit, and means for indicating current flow in said plate circuit.

OLIVER T. FRANCIS.

REFERENCES CITED

The following references are of record in the file of this patent:

UNITED STATES PATENTS

| Number | Name | Date |
|---|---|---|
| 1,593,993 | Sprague | July 27, 1926 |
| 1,801,657 | Buyko | Apr. 21, 1931 |
| 2,106,172 | Haffcke | Jan. 25, 1938 |
| 2,130,443 | Willis | Sept. 20, 1938 |
| 2,153,202 | Nichols | Apr. 4, 1939 |
| 2,211,942 | White | Aug. 20, 1940 |
| 2,241,256 | Gould | May 6, 1941 |
| 2,266,401 | Reeves | Dec. 16, 1941 |
| 2,275,930 | Torcheux | Mar. 10, 1942 |
| 2,359,447 | Seeley | Oct. 3, 1944 |